US012724812B2

(12) United States Patent
Bandyopadhyay et al.

(10) Patent No.: US 12,724,812 B2
(45) Date of Patent: Sep. 1, 2026

(54) AUTOMATIC GENERATION OF HANDOUTS FROM MULTI-MODAL DOCUMENTS

(71) Applicant: ADOBE INC., San Jose, CA (US)

(72) Inventors: Sambaran Bandyopadhyay, Bangalore (IN); Shwetha Somasundaram, Chennai (IN); Nandakishore Kambhatla, Bangalore (IN)

(73) Assignee: ADOBE INC., San Jose, CA (US)

( * ) Notice: Subject to any disclaimer, the term of this patent is extended or adjusted under 35 U.S.C. 154(b) by 317 days.

(21) Appl. No.: 18/542,161

(22) Filed: Dec. 15, 2023

(65) Prior Publication Data

US 2025/0200095 A1 Jun. 19, 2025

(51) Int. Cl.

| | |
|---|---|
| ***G06F 40/186*** | (2020.01) |
| ***G06F 16/34*** | (2019.01) |
| ***G06F 40/284*** | (2020.01) |
| ***G06F 40/40*** | (2020.01) |

(52) U.S. Cl.

CPC .......... *G06F 16/345* (2019.01); *G06F 40/186* (2020.01); *G06F 40/284* (2020.01); *G06F 40/40* (2020.01)

(58) Field of Classification Search

CPC .... G06F 16/345; G06F 40/186; G06F 40/284; G06F 40/40; G06F 40/56

See application file for complete search history.

(56) References Cited

U.S. PATENT DOCUMENTS

| | | | | |
|---|---|---|---|---|
| 5,623,679 | A | 4/1997 | Rivette et al. | |
| 8,804,139 | B1 | 8/2014 | Arora et al. | |
| 11,797,780 | B1 * | 10/2023 | Finegan | G06F 40/40 |
| 2022/0269713 | A1 * | 8/2022 | Wang | G06N 3/09 |
| 2024/0126981 | A1 * | 4/2024 | Shahinian | G06F 40/40 |

OTHER PUBLICATIONS

Chaturvedi et al. "Divide and Conquer: From Complexity to Simplicity for Lay Summarization" Proceeding of the First Workshop on Scholarly Document Processing; Nov. 19, 2020, pp. 344-355 (Year: 2020).*

Mukerjee et al. "Topic-aware Multimodal Summarization", Findings of the Association for Computational Linguistics: AACL-IJCNLP 2022, pp. 387-398 (Year: 2022).*

Marsh, et al., "Access to Handouts of Presentation Slides During Lecture: Consequences for Learning", Applied Cognitive Psychology, 24(5), Apr. 27, 2009, 16 pages.

(Continued)

*Primary Examiner* — Daniel C Washburn
*Assistant Examiner* — Penny L Caudle
(74) *Attorney, Agent, or Firm* — F. CHAU & ASSOCIATES, LLC

(57) ABSTRACT

Embodiments of the present disclosure include generating a summary of a source document. Some embodiments generate a set of topics based on the summary and a predetermined number of topics. An expanded text is generated for each of the plurality of topics. An image is selected from the source document for each of the set of topics by computing a similarity score between the image and the expanded text. Then, a summary document is generated based on the plurality of topics and the expanded text.

20 Claims, 12 Drawing Sheets

(56) References Cited

OTHER PUBLICATIONS

Li, et al., "Multi-modal Summarization for Asynchronous Collection of Text, Image, Audio and Video", In Proceedings of the 2017 Conference on Empirical Methods in Natural Language Processing, pp. 1092-1102, (Sep. 2017).

Jangra, et al., "Text-Image-Video Summary Generation Using Joint Integer Linear Programming", In Advances in Information Retrieval: 42nd European Conference on IR Research, ECIR 2020, Lisbon, Portugal, Apr. 14-17, 2020, Proceedings, Part II 42, pp. 190-198, (Apr. 2020).

Zhu, et al., "MSMO: Multimodal Summarization with Multimodal Output", In Proceedings of the 2018 conference on empirical methods in natural language processing, pp. 4154-4164, (Oct. 2018).

Zhu, et al., "Multimodal Summarization with Guidance of Multimodal Reference", In Proceedings of the AAAI Conference on Artificial Intelligence, vol. 34, No. 05, pp. 9749-9756, (Apr. 2020).

Jiang, et al., "Exploiting Pseudo Image Captions For Multimodal Summarization", arXiv preprint arXiv:2305.05496 [cs.CL] May 9, 2023, 13 pages.

Microsoft Support, "Create or change a presentation's handout", Oct. 2023, Found on the Internet, https://support.microsoft.com/en-au/office/create-or-change-a-presentation-s-handout-c86f1231-abfd-48de-8d76-807f668512d2#:~:text=Click%20File%20%3E%20Print.,return%20to%20your%20previous%20view, 5 pages.

Python-openxml/python-docx, "Create and modify Word documents with Python", Oct. 2023, Found on the Internet, https://github.com/python-openxml/python-docx/tree/master, 2 pages.

OpenAI API, "Models", Oct. 2023, Found on the Internet, https://platform.openai.com/docs/models/gpt-3-5, 8 pages.

Adobe Firefly, "Generative AI for everyone", Oct. 2023, Found on the Internet, https://www.adobe.com/sensei/generative-ai/firefly.html, 15 pages.

* cited by examiner

The Science of Earthquakes

305

By Earthquake Hazards Program

Originally written by Lisa Wald (U.S. Geological Survey) for "The Green Frog News"

What is an earthquake?

310

315

An earthquake is what happens when two blocks of the earth suddenly slip past one another. The surface where they slip is called the fault or fault plane. The location below the earth's surface where the earthquake starts is called the hypocenter, and the location directly above it on the surface of the earth is called the epicenter.

Sometimes an earthquake has foreshocks. These are smaller earthquakes that happen in the same place as the larger earthquake that follows. Scientists can't tell that an earthquake is a foreshock until the larger earthquake happens. The largest, main earthquake is called the mainshock. Mainshocks always have aftershocks that follow. These are smaller earthquakes that occur afterwards in the same place as the mainshock. Depending on the size of the mainshock, aftershocks can continue for weeks, months, and even years after the mainshock!

320

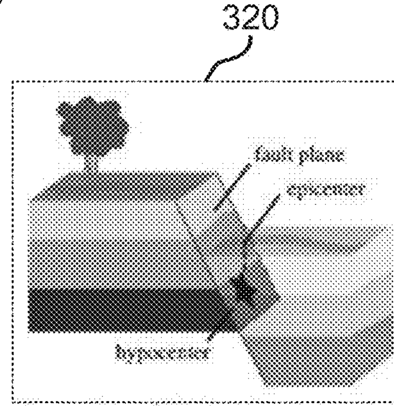

Sources/Usage: Public Domain.

A normal (dip-slip) fault is an inclined fracture where the rock mass above an inclined fault moves down (Public domain.)

What causes earthquakes and where do they happen?

325

CRUST

MANTLE

Liquid

CORE

The earth has four major layers: the inner core, outer core, mantle and crust. The crust and the top of the mantle make up a thin skin on the surface of our planet.

But this skin is not all in one piece – it is made up of many pieces like a puzzle covering the surface of the earth. Not only that, but these puzzle pieces keep slowly moving around, sliding past one another and bumping into each other. We call these puzzle pieces tectonic plates, and the edges of the plates are called the plate boundaries. The plate boundaries are made up of many faults, and most of the earthquakes around the world occur on these faults. Since the edges of the plates are rough, they get stuck while the rest of the plate keeps moving. Finally, when the plate has moved far enough, the edges unstick on one of the faults and there is an earthquake.

Exploring Earthquakes And Faults
Unlocking the Mysteries of Earthquakes

1. What is an Earthquake? 405

410

An earthquake is what happens when two blocks of the earth suddenly slip past one another. The surface where they slip is called the fault or fault plane. The location below the earth's surface where the earthquake starts is called the hypocenter, and the location directly above it on the surface of the earth is called the epicenter. Sometimes an earthquake has foreshocks and mainshocks.

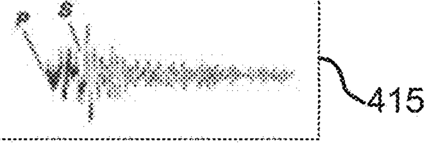

415

420

2. What causes Earthquakes and Where Do They Happen?

425

The earth has four major layers: the inner core, outer core, mantle and crust. The crust and the top of the mantle make up a thin skin on the surface of our planet. But this skin is not all in one piece – it is made up of many pieces like a puzzle covering the surface of the earth. Earthquakes occur on the plate boundaries, which are made up of many faults.

3. Why Does the Earth Shake When There Is an Earthquake?

When the force of the moving blocks finally overcomes the friction of the jagged edges of the fault and it unsticks, all that stored up energy is released. The energy radiates outward from the fault in all directions in the form of seismic waves like ripples on a pond. The seismic waves shake the earth as they move through it.

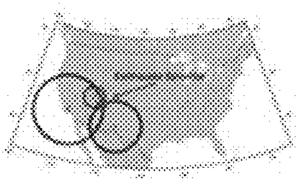

4. How Are Earthquakes Recorded?

Earthquakes are recorded by instruments called seismographs. The recording they make is called a seismogram. The seismograph has a base that sets firmly in the ground, and a heavy weight that hangs free. When an earthquake causes the ground to shake, the base of the seismograph shakes too, but the hanging weight does not.

Figure 12:
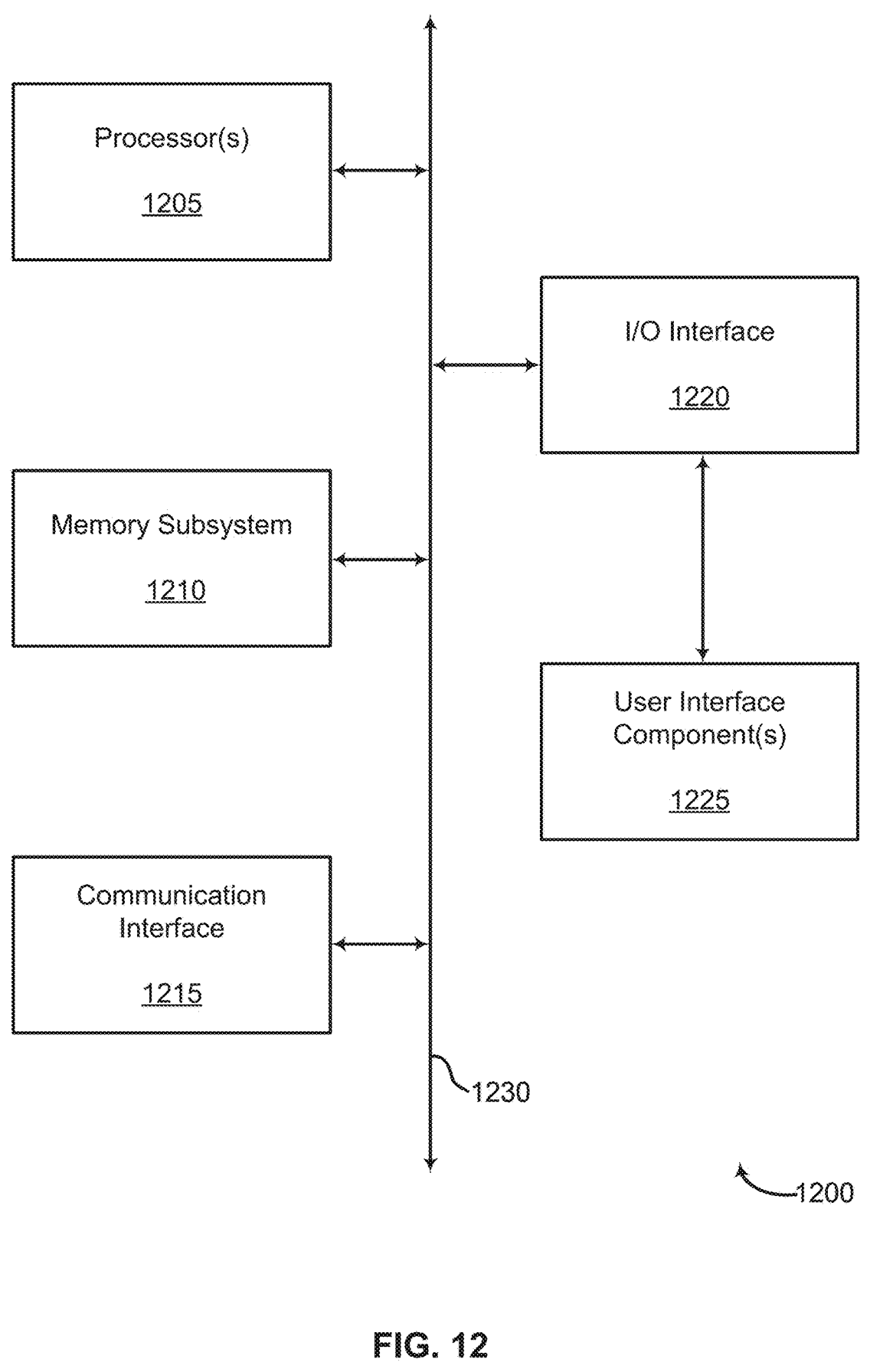

Processor(s)
1205

I/O Interface
1220

Memory Subsystem
1210

User Interface Component(s)
1225

Communication Interface
1215

AUTOMATIC GENERATION OF HANDOUTS FROM MULTI-MODAL DOCUMENTS

BACKGROUND

The following relates generally to natural language processing (NLP), and more specifically to document summarization using machine learning. Natural language processing refers to techniques for using computers to interpret or generate natural language. In some cases, NLP tasks involve assigning annotation data such as grammatical information to words or phrases within a natural language expression. Different classes of machine-learning algorithms have been applied to NLP tasks. In some examples, generative pre-trained transformer (GPT) models are trained to understand natural language and code. GPT models provide text outputs in response to their inputs (e.g., a prompt from a user).

Document summarization refers to techniques and processes of generating summary documents based on source documents where the summary documents capture the main idea, topics, and key substantive points mentioned in the source documents. In some examples, presentations, posters, and handouts are effective and convenient ways to communicate in business operations, academic conferences, etc.

SUMMARY

The present disclosure describes systems and methods for natural language processing. Embodiments of the present disclosure include an NLP apparatus configured to generate a summary document (e.g., a handout) based on a source document. A language generation model is used to generate a summary of the source document. Then, a set of topics are generated based on the summary of the source document and a predetermined number of topics. The language generation model generates expanded content for each of the topics. In some examples, the summary document is a multi-modal handout including the expanded text and image(s) corresponding to each of the generated topics.

A method, apparatus, and non-transitory computer readable medium for natural language processing are described. One or more embodiments of the method, apparatus, and non-transitory computer readable medium include generating, using a language generation model, a summary of a source document; generating, using the language generation model, a plurality of topics based on the summary and a predetermined number of topics; generating, using the language generation model, expanded text for each of the plurality of topics; selecting an image from the source document for each of the plurality of topics by computing a similarity score between the image and the expanded text; and generating a summary document including the plurality of topics, the expanded text, and the selected image.

An apparatus and method for natural language processing are described. One or more embodiments of the apparatus and method include at least one processor; at least one memory including instructions executable by the at least one processor; a language generation model comprising parameters stored in the at least one memory and configured to generate a summary of a source document, a plurality of topics based on the summary and a predetermined number of topics, and expanded text for each of the plurality of topics; an extraction component comprising parameters stored in the at least one memory and configured to select an image from the source document for each of the plurality of topics by computing a similarity score between the image and the expanded text; and a document generator comprising parameters stored in the at least one memory and configured to generate a summary document based on the plurality of topics and the expanded text.

BRIEF DESCRIPTION OF THE DRAWINGS

FIG. 3 shows an example of a source document according to aspects of the present disclosure.

FIG. 4 shows an example of a summary document according to aspects of the present disclosure.

FIG. 12 shows an example of a computing device according to aspects of the present disclosure.

DETAILED DESCRIPTION

Figure 1:
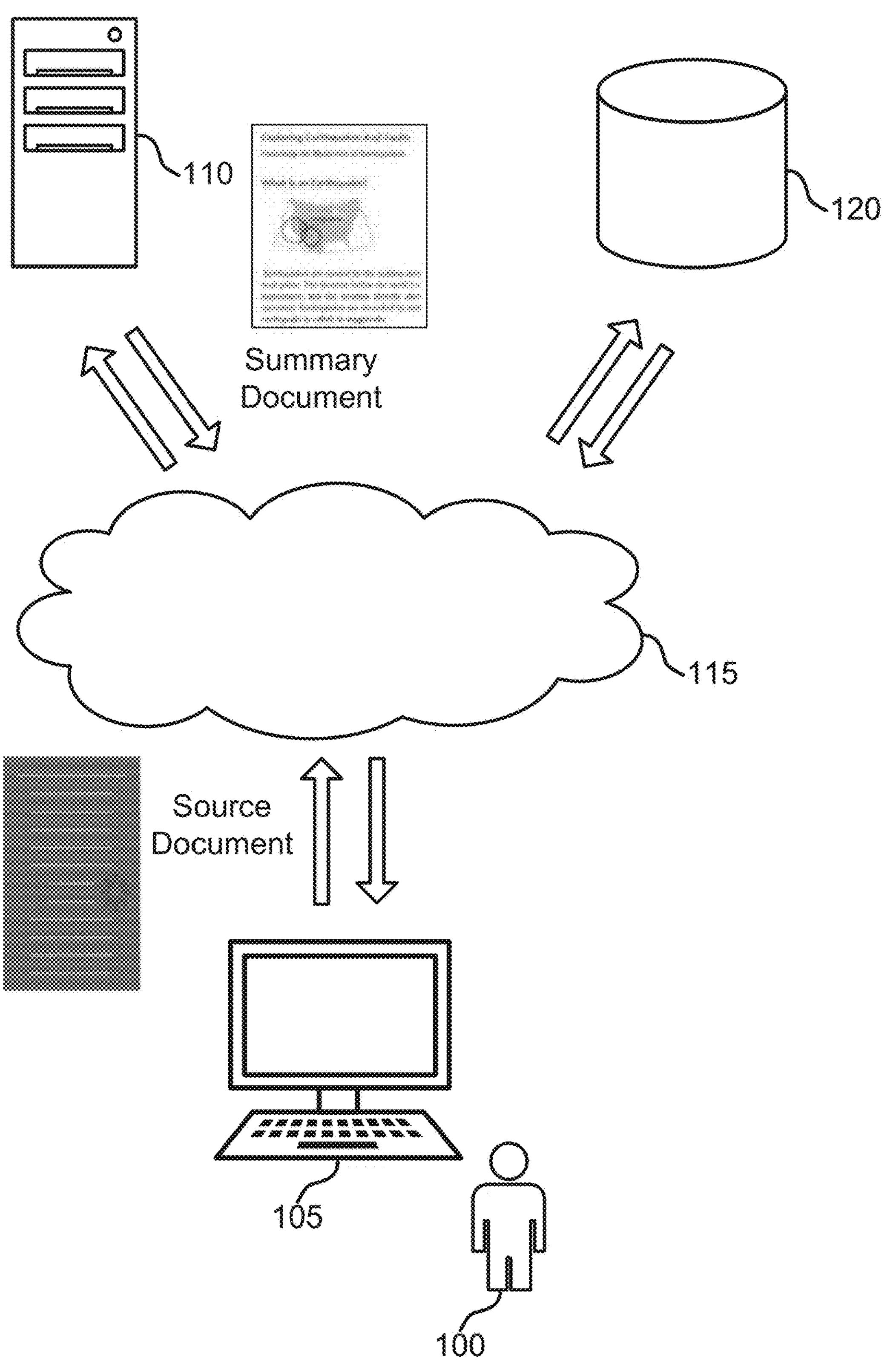
FIG. 1 shows an example of a natural language processing (NLP) system according to aspects of the present disclosure.

The present disclosure describes systems and methods for natural language processing. Embodiments of the present disclosure include an NLP apparatus configured to generate a summary document (e.g., a handout) based on a source document. A language generation model is used to generate a summary of the source document. Then, a set of topics are generated based on the summary of the source document and a predetermined number of topics. The language generation model generates expanded content for each of the topics. In some examples, the summary document is a multi-modal handout including the expanded text and image(s) corresponding to each of the generated topics.

Document summarization is the process of analyzing a source document to produce a concise and appealing document that maintains key points and ideas expressed in the source document. Machine learning models have been used in document processing tasks, such as generating summaries based on input text. However, these conventional models are not able to process long documents or generate handout-type documents that are multi-modal (e.g., comprising text and image). For example, a summary generation tool takes a user prompt as input to generate an output, rather than a source document as input. Furthermore, conventional models cannot preserve a complete list of key topics due to the flat content hierarchy of certain input documents. Hence, content coverage associated with the summary documents is poor and user experience is decreased.

Embodiments of the present disclosure include an NLP apparatus configured to generate a summary document based on a source document. In some cases, a Transformer-based language generation model (e.g., GPT) generates a summary of the source document. The language generation model generates a set of topics based on the summary and a predetermined number of topics.

An extraction component of the NLP apparatus is configured to extract text content and images from the source document. The summary of the source document is based on the extracted text content. The images extracted from the source document are selected and added to the summary document depending on their relevancy with expanded content under each of the topics. In some examples, users, via a user interface, provide feedback on a set of provisional topics. For example, users add, remove, or modify the set of provisional topics.

In some embodiments, the NLP apparatus is configured to divide the text content into a set of segments based on an input size of the language generation model (e.g., a maximum token length). The language generation model generates a set of segment summaries corresponding to the set of segments, respectively. The set of segment summaries are combined to obtain a combined summary of the source document.

In some embodiments, a prompt is input to the language generation model where the prompt includes instructions to generate the set of topics to cover contents of the summary. Alternatively or additionally, the prompt may also include instructions to generate the set of topics that are different from each other. Then the language generation model generates expanded text for each of the topics. In some examples, the expanded text corresponding to each topic includes one or more sentences elaborating the corresponding topic. The number of sentences in the expanded text can be adjusted by users (e.g., change to fewer number of sentences).

In some cases, the extracted images from the source document are selected based on the relevancy between the images and the expanded content under each topic. For example, a contrastive language-image pre-training (CLIP) model generates CLIP embedding of expanded content and images. Then a similarity score is computed between the CLIP text embedding and respective CLIP image embedding. An image with the highest similarity score is selected for each of the topics and that image is included under the corresponding topic. In some cases, an image generation model (e.g., a diffusion model) generates one or more synthesized images based on a text prompt (e.g., a section heading).

Embodiments of the disclosure improve on conventional document summarization by automatically generating a summary document (e.g., a handout) based on a source document. The source document comprises multi-modal information (text, images) and the generated summary document also includes multi-modal information. A language generation model is used to generate a summary of the source document and then generate a set of topics based on the summary. The language generation model ensures that the generated topics can cover the entire document (coverage) and the topics are different from each other (diversity). Accordingly, expanded content under each of the topics, along with relevant images extracted from the source document, can cover the main ideas and points mentioned in the source document while maintaining a visually appealing summary output.

Embodiments of the present disclosure can be used in the context of document processing applications. For example, an NLP apparatus based on the present disclosure receives a source document and generates a summary document comprising a set of topics and expanded text for each of the topics. An example application in the document summarization and handout generation context is provided with reference to FIGS. 2-4. Details regarding the architecture of an example NLP system are provided with reference to FIGS. 1 and 6-8. Details regarding the process of image processing are provided with reference to FIGS. 5 and 9-11.

Text Processing System

In FIGS. 1-5, a method, apparatus, and non-transitory computer readable medium for natural language processing are described. One or more embodiments of the method, apparatus, and non-transitory computer readable medium include generating, using a language generation model, a summary of a source document; generating, using the language generation model, a plurality of topics based on the summary and a predetermined number of topics; generating, using the language generation model, expanded text for each of the plurality of topics; selecting an image from the source document for each of the plurality of topics by computing a similarity score between the image and the expanded text; and generating a summary document including the plurality of topics, the expanded text, and the selected image.

Some examples of the method, apparatus, and non-transitory computer readable medium further include extracting text content from the source document, wherein the summary is based on the text content.

Some examples of the method, apparatus, and non-transitory computer readable medium further include dividing the text content into a plurality of segments based on an input size of the language generation model. Some examples further include generating a plurality of segment summaries corresponding to the plurality of segments, respectively. Some examples further include combining the plurality of segment summaries to obtain the summary of the source document.

Some examples of the method, apparatus, and non-transitory computer readable medium further include identifying a plurality of images from the source document and a pre-determined selection factor. Some examples further include filtering the plurality of images based on the pre-determined selection factor to obtain a filtered set of images, wherein the filtered set of images includes the selected image.

Some examples of the method, apparatus, and non-transitory computer readable medium further include generating a multi-modal text embedding based on the expanded text; generating a multi-modal image embedding based on the image; and computing the similarity score by comparing the multi-modal text embedding and the multi-modal image embedding.

Some examples of the method, apparatus, and non-transitory computer readable medium further include identifying an image from the source document. Some examples further include selecting the image to represent a topic of the plurality of topics, wherein the summary document includes the selected image.

Some examples of the method, apparatus, and non-transitory computer readable medium further include computing a similarity score between the image and the expanded text corresponding to the topic, wherein the image is selected based on the similarity score.

Some examples of the method, apparatus, and non-transitory computer readable medium further include extracting a plurality of images from the source document. Some examples further include filtering the plurality of images to obtain a filtered set of images, wherein the image is selected from the filtered set of images.

Some examples of the method, apparatus, and non-transitory computer readable medium further include generating a synthesized image based on a topic of the plurality of topics, wherein the summary document includes the synthesized image.

Some examples of the method, apparatus, and non-transitory computer readable medium further include generating a plurality of provisional topics. Some examples further include receiving user input on the plurality of provisional topics. Some examples further include updating the plurality of provisional topics based on the user input to obtain the plurality of topics.

Some examples of the method, apparatus, and non-transitory computer readable medium further include generating a prompt for the language generation model that includes instructions to generate the plurality of topics to cover content of the summary.

Some examples of the method, apparatus, and non-transitory computer readable medium further include generating a prompt for the language generation model that includes instructions to generate the plurality of topics to be different from each other.

Some examples of the method, apparatus, and non-transitory computer readable medium further include obtaining a document template. Some examples further include generating the summary document based on the document template. In some examples, the summary document is a multi-modal handout including an image corresponding to each of the plurality of topics.

FIG. 1 shows an example of an NLP system according to aspects of the present disclosure. The example shown includes user 100, user device 105, NLP apparatus 110, cloud 115, and database 120. NLP apparatus 110 is an example of, or includes aspects of, the corresponding element described with reference to FIG. 6.

In an example shown in FIG. 1, a source document (e.g., .docx, .PDF format) is provided by a user 100 and transmitted to NLP apparatus 110, e.g., via user device 105 and cloud 115. The source document includes multi-modal content (text, images, etc.). An extraction tool (e.g., Extract API) is used to extract text content and images from the source document.

NLP apparatus 110 generates, via a language generation model, a combined summary based on the source document. The combined summary is also referred to as a summary of the source document. NLP apparatus 110 generates, via the language generation model, a set of topics based on the combined summary. The set of generated topics covers important aspects of the source document. The phrases of the topic titles may be different from the section titles in the source document. User 100 may modify the set of topics via a user interface. NLP apparatus 110 then generates, via the language generation model, expanded text content (e.g., multiple sentences) for each of the generated topics.

NLP apparatus 110 selects images from the source document and places the images to accompany a corresponding topic. NLP apparatus 110 generates a summary document (e.g., a handout) based on the set of topics and the expanded text and returns the summary document to user 100 via cloud 115 and user device 105. The summary document is of format such as .docx, .PDF, etc., and includes visually rich multi-modal content. In some examples, the summary document spans one or more pages in length and is relatively concise compared to the source document. The process of using NLP apparatus 110 is further described with reference to FIG. 2.

User device 105 may be a personal computer, laptop computer, mainframe computer, palmtop computer, personal assistant, mobile device, or any other suitable processing apparatus. In some examples, user device 105 includes software that incorporates a text processing application (e.g., a document summarization application, or handout generator). In some examples, the text editing application on user device 105 may include functions of NLP apparatus 110.

A user interface may enable user 100 to interact with user device 105. In some embodiments, the user interface may include an audio device, such as an external speaker system, an external display device such as a display screen, or an input device (e.g., a remote control device interfaced with the user interface directly or through an I/O controller module). In some cases, a user interface may be a graphical user interface (GUI). In some examples, a user interface may be represented in code which is sent to the user device 105 and rendered locally by a browser.

NLP apparatus 110 includes a computer implemented network comprising a user interface, an extraction component, a language generation model, an image generation model, and a document generator. NLP apparatus 110 may also include a processor unit, a memory unit, an I/O module, and a training component. The training component is used to train a machine learning model (or a natural language processing network). Additionally, NLP apparatus 110 can communicate with database 120 via cloud 115. In some cases, the architecture of the natural language processing network is also referred to as a network, a machine learning model, or a network model. Further detail regarding the architecture of NLP apparatus 110 is provided with reference to FIGS. 6-8. Further detail regarding the operation of NLP apparatus 110 is provided with reference to FIGS. 5 and 9-11.

In some cases, NLP apparatus 110 is implemented on a server. A server provides one or more functions to users linked by way of one or more of the various networks. In some cases, the server includes a single microprocessor board, which includes a microprocessor responsible for controlling all aspects of the server. In some cases, a server uses microprocessor and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general purpose computing device, a personal computer, a laptop computer, a mainframe computer, a supercomputer, or any other suitable processing apparatus.

Cloud 115 is a computer network configured to provide on-demand availability of computer system resources, such as data storage and computing power. In some examples, cloud 115 provides resources without active management by the user. The term cloud is sometimes used to describe data centers available to many users over the Internet. Some large cloud networks have functions distributed over multiple locations from central servers. A server is designated an edge server if it has a direct or close connection to a user. In some cases, cloud 115 is limited to a single organization. In other examples, cloud 115 is available to many organizations. In one example, cloud 115 includes a multi-layer communications network comprising multiple edge routers and core routers. In another example, cloud 115 is based on a local collection of switches in a single physical location.

Database 120 is an organized collection of data. For example, database 120 stores data (e.g., source documents, output documents) in a specified format known as a schema. Database 120 may be structured as a single database, a distributed database, multiple distributed databases, or an emergency backup database. In some cases, a database controller may manage data storage and processing in database 120. In some cases, a user interacts with database controller. In other cases, database controller may operate automatically without user interaction.

Figure 2:
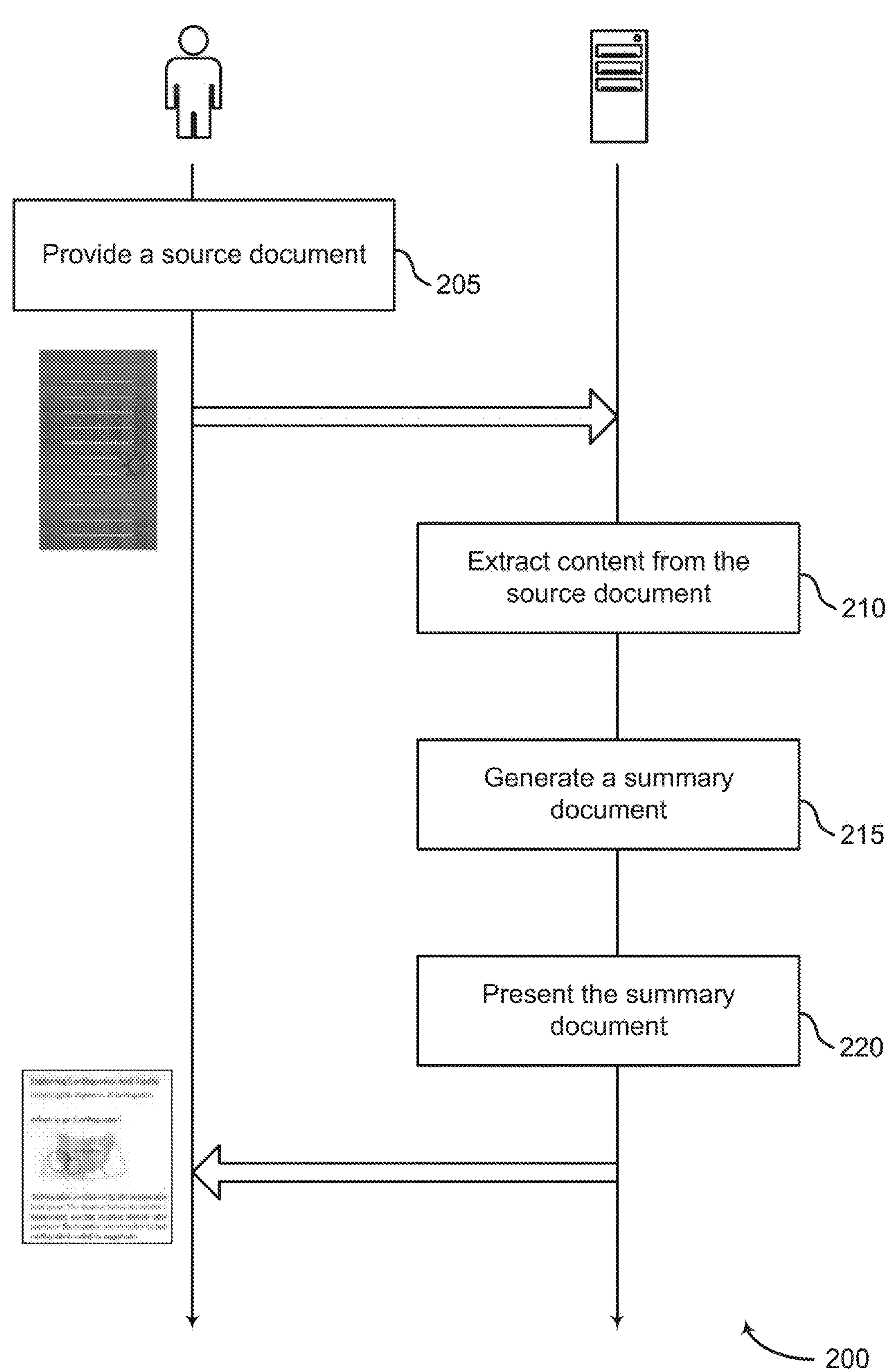
FIG. 2 shows an example of a method of document processing according to aspects of the present disclosure.

FIG. 2 shows an example of a method 200 for document processing according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 205, the user provides a source document. In some cases, the operations of this step refer to, or may be performed by, a user as described with reference to FIG. 1. In some examples, the user uploads a source document from a local device and the source document is transmitted to the NLP apparatus via user device and cloud. In some embodiments, a machine learning model (with reference to FIGS. 6 and 7) automatically generates a handout from a multi-modal source document. The source document is semi-structured and visually rich. In some cases, the source document includes a document title, multiple section topics, content segments describing the corresponding section topics, and images related to the section topics.

At operation 210, the system extracts content from the source document. In some cases, the operations of this step refer to, or may be performed by, an NLP apparatus as described with reference to FIGS. 1 and 6. In some examples, an extraction component is configured to extract content (e.g., text content, images) from the source document. A summary document of the source document is based on the extracted content.

At operation 215, the system generates a summary document. In some cases, the operations of this step refer to, or may be performed by, an NLP apparatus as described with reference to FIGS. 1 and 6. In some examples, the machine learning model is configured to generate multi-modal content grounded on the source document. In some examples, the summary document is a multi-page handout that represent a summary of the source document. In some embodiments, a language generation model is used to generate a summary of the source document and then generate a set of topics based on the summary and a predetermined number of topics. Accordingly, the machine learning model generates expanded text under each of the topics and selects one or more images from the source document for each of the topics. The summary document includes the set of topics, expanded text, and relevant images.

At operation 220, the system presents the summary document to the user. In some cases, the operations of this step refer to, or may be performed by, a user interface as described with reference to FIGS. 6 and 7. In some examples, the summary document is a multi-page handout that summarizes the source document with multi-modal content grounded on the source document. In some cases, the summary document includes multiple topics, corresponding expanded text for each of the topics, and images related to each of the topics.

FIG. 3 shows an example of a source document 300 according to aspects of the present disclosure. The example shown includes source document 300, document title 305, first original topic 310, first segment 315, first image 320, second original topic 325, second segment 330, and second image 335.

In an example illustrated in FIG. 3, source document 300 has a document title 305 ("The Science of Earthquakes"). Source document 300 includes first original topic 310 and second original topic 325. First original topic 310 is titled "what is an earthquake". Second original topic 325 is titled "what causes earthquakes and where do they happen". First segment 315 includes multiple sentences or paragraphs to elaborate on first original topic 310. First image 320 is positioned on the right-hand side in relation to first segment 315. Second segment 330 includes multiple sentences or paragraphs to elaborate on second original topic 325. Second image 335 is positioned on the left-hand side in relation to second segment 330.

FIG. 4 shows an example of a summary document 400 according to aspects of the present disclosure. The example shown includes summary document 400, first topic 405, first expanded text 410, image 415, second topic 420, and second expanded text 425.

In an example illustrated in FIG. 4, summary document 400 is a handout. Summary document 400 includes first topic 405 ("1. What is an earthquake?") and second topic 420 ("2. What causes Earthquakes and where to they happen?"). In an embodiment, a machine learning model (with reference to FIGS. 6 and 7) generates first expanded text 410 that describes first topic 405. The machine learning model generates second expanded text 425 that describes second topic 420. The machine learning model extracts image 415 from the source document and places image 415 next to first expanded text 410. In some examples, image 415 is a synthesized image generated by an image generation model (e.g., a diffusion model).

Referring to FIGS. 3 and 4, topic titles in summary document 400 may not match the exact phrases as in source document 300. For examples, topic titles in summary document 400 (e.g., first topic 405, second topic 420, third topic, . . . ) include sequence numerals (e.g., "1.", "2.") to indicate an ordering of the topic titles. Words in topic titles of summary document 400 are capitalized and words in section titles of source document 300 are not capitalized. (e.g., first original topic 310 and second original topic 325). In some cases, second topic 420 is generated by a language generation model and is phrased as "2. What is a cause of Earthquakes and their locations?").

In some examples, a handout includes one or more pages in length (e.g., 1-3 pages long). The handout includes whitespaces for notetaking. The handout uses cleaner fonts such as Times New Roman to ensure focus is not taken away from the content in the document. The handout includes tables and/or charts which are accompanied by a short but sufficient explanation. A comprehensive handout is apt for the situation when no suitable textbooks or learning guides are available for reference (e.g., summary document 400 is a multimodal summary).

In some examples, summary document 400 includes a detailed outline comprising the main topic headings of a presentation. Summary document 400 is a visually rich multi-modal representation of a source document. Summary document 400 (e.g., handout) includes multiple pages, is relatively short compared to the source document, and is written in a formal language. A handout has multiple pages, and accordingly, coverage is more important than diversity in a handout. In some cases, the handout is self-explanatory as much as possible.

Figure 5:
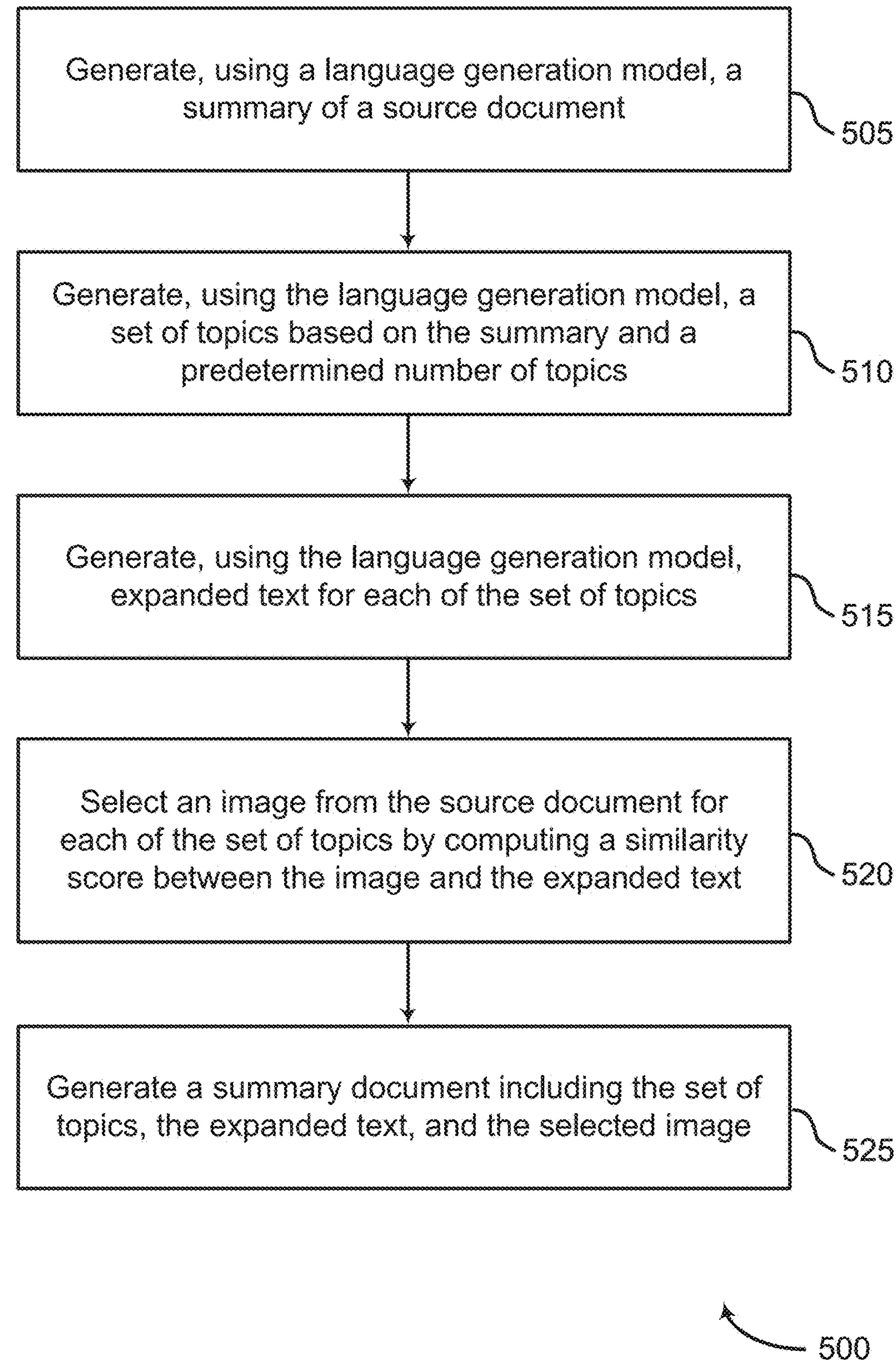
FIG. 5 shows an example of a method for natural language processing according to aspects of the present disclosure.

FIG. 5 shows an example of a method 500 for natural language processing according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 505, the system generates, using a language generation model, a summary of a source document. In some cases, the operations of this step refer to, or may be performed by, a language generation model as described with reference to FIGS. 6 and 7. In some embodiments, a machine learning model (see FIGS. 6 and 7) automatically generates a handout from a multi-modal source document. The source document is semi-structured and visually rich. In some examples, the source document is a comprehensive, multi-modal and long document. Different parts of the source document are inter-related. The source document is multi-modal, and it includes text, natural images (e.g., pictures of a place, pictures of animals), other types of images (e.g., flowchart of a process, architecture of a neural network), tables, etc. The machine learning model is configured to generate multi-modal content grounded on the source document (e.g., a multi-page handout).

Figure 10:
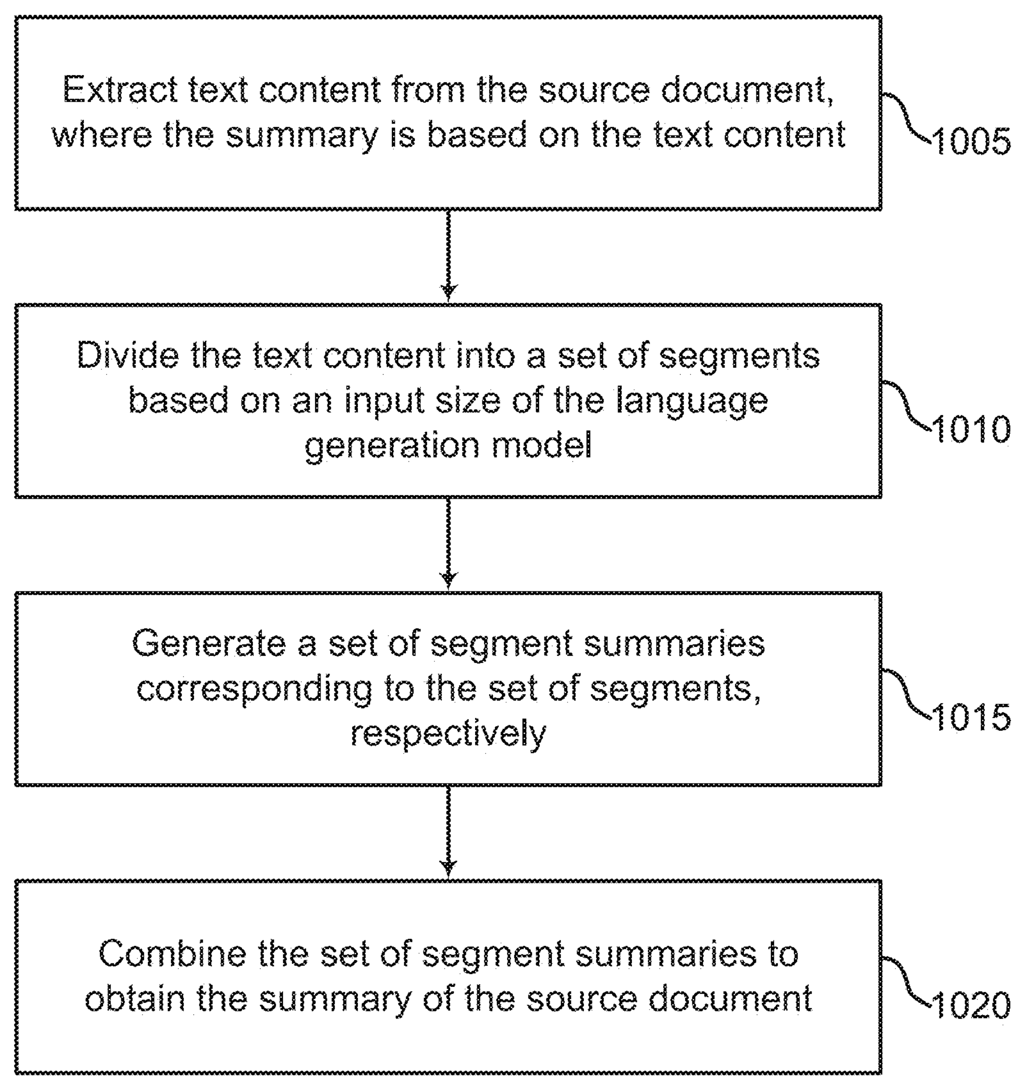
FIG. 10 shows an example of a method for generating a summary of a source document according to aspects of the present disclosure.
Figure 11:
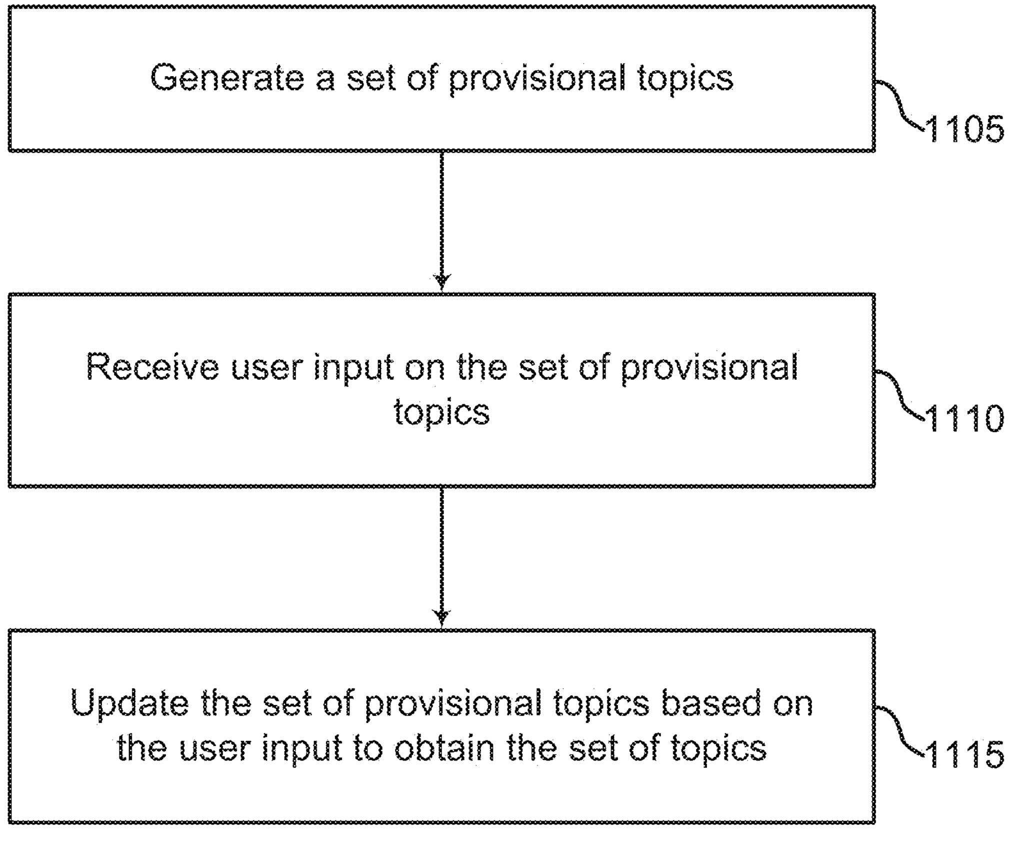
FIG. 11 shows an example of a method for updating topics according to aspects of the present disclosure.

In some embodiments, the language generation model generates a concatenated summary for the entire source document using a hierarchical approach (described in greater detail in FIGS. 10 and 11).

Here, operations 505, 510, and 515 involve multi-modal content planning, summary and, reformatting of the content for the summary document. Content planning includes deciding the number of elements of different modalities (text, images, etc.) to place in the summary document and then selecting appropriate content elements from the source document.

At operation 510, the system generates, using the language generation model, a set of topics based on the summary and a predetermined number of topics. In some cases, the operations of this step refer to, or may be performed by, a language generation model as described with reference to FIGS. 6 and 7.

In some embodiments, the number of text and number of image modalities to put in the summary document are hyper-parameters set by users. In absence of such input from users, one can use clustering or topic modeling algorithm to detect the number of content clusters/topics present in the source document and choose the number of topics accordingly.

In some embodiments, the language generation model generates a set of topics based on the concatenated summary. Users, via user interface, can provide feedback about the set of topics. The language generation model expands each topic of the topics to obtain expanded text for each of the topics. The number of topics to be included in the summary document in part depends on the content from the source document. Users can also adjust the number of topics via setting hyperparameters or feedback.

In some cases, key topics of the source document are concisely represented in the summary document. The language generation model is configured to identify underlying topics from flat content because original content of the source document may not be divided into multiple sections or subsections.

At operation 515, the system generates, using the language generation model, expanded text for each of the set of topics. In some cases, the operations of this step refer to, or may be performed by, a language generation model as described with reference to FIGS. 6 and 7. In some cases, operations 505, 510, and 515 together are also referred to as multi-modal content planning stage. At the multi-modal content planning stage, the machine learning model (with reference to FIGS. 6 and 7) generates the content (text and images) which is needed to generate the summary document (e.g., handout). The machine learning model determines and tracks which text content of the source document is title, section title, and paragraph.

The machine learning model is configured to enable a global view of the source document to identify key concepts and then the machine learning model summarizes content within a concept into a corresponding section of a summary document (e.g., a handout), irrespective of their respective locations in the source document.

At operation 520, the system selects an image from the source document for each of the set of topics by computing a similarity score between the image and the expanded text. In some cases, the operations of this step refer to, or may be performed by, an extraction component as described with reference to FIGS. 6 and 7.

In some embodiments, one or more images are selected from to accompany expanded text (or a generated text segment). In some examples, the source document contains noisy images and a pre-determined selection factor is used to filter out these noisy images. For example, if the aspect ratio of an image is greater than 2 or less than 0.5, the extraction component filters it out. Hashing algorithm is used to detect images which are similar to each other and the extraction component removes all occurrences except one. Additionally or alternatively, the extraction component remove images such as logos, headers and footers that appear multiple times in a document and/or images that are not relevant to the set of the topics. The machine learning model (with reference to FIGS. 6 and 7) ranks the filtered images from the source document according to their similarity with each expanded text. For example, similarity is computed by considering the cosine similarity of the CLIP embedding of the text and the filtered images. The machine learning model selects an image that has the highest similarity.

Content from other modalities is identified from the source document and placed along with the expanded text. The machine learning model is configured to understand the semantic relations between multi-modal content (e.g., relation between a text and an image, relation between a natural image and a table, etc.).

At operation 525, the system generates a summary document including the set of topics, the expanded text, and the selected image. In some cases, the operations of this step refer to, or may be performed by, a document generator as described with reference to FIGS. 6 and 7. In some examples, Python® library (python-docx) is used to place the generated titles, subtitles, paragraphs, and the images associated with relevant paragraphs in a summary document.

In some examples, the summary document is a generated handout that includes multi-modal summary of the source document. In the multi-modal content planning phase, it is ensured that the text and the images placed under a section are relevant to each other. If sufficient images are not present in the source document, a diffusion model generates one or more synthesized images. The one or more synthesized images are placed next to respective expanded text in a corresponding section of the handout.

Network Architecture

Figure 6:
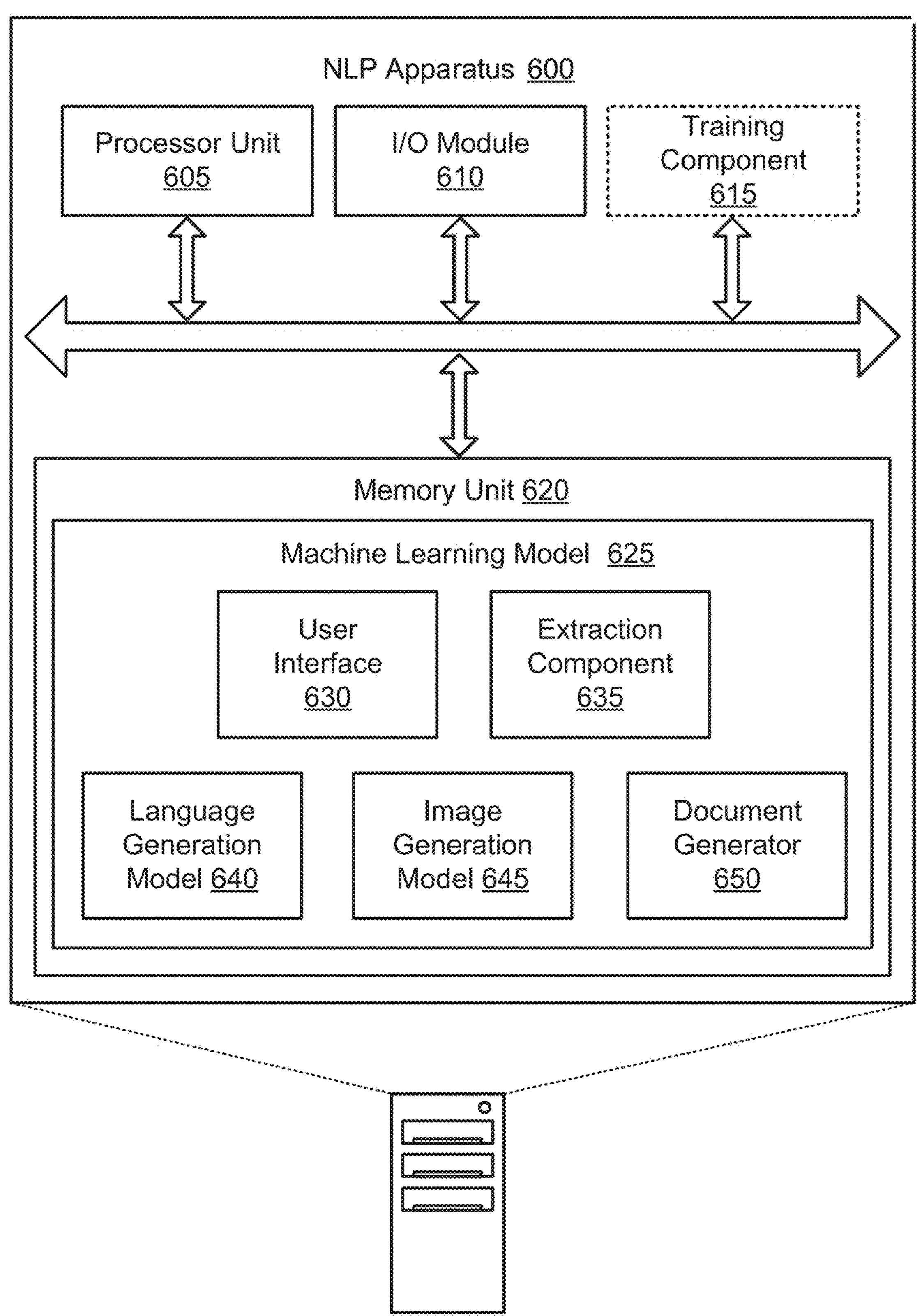
FIG. 6 shows an example of an NLP apparatus according to aspects of the present disclosure.
Figure 7:
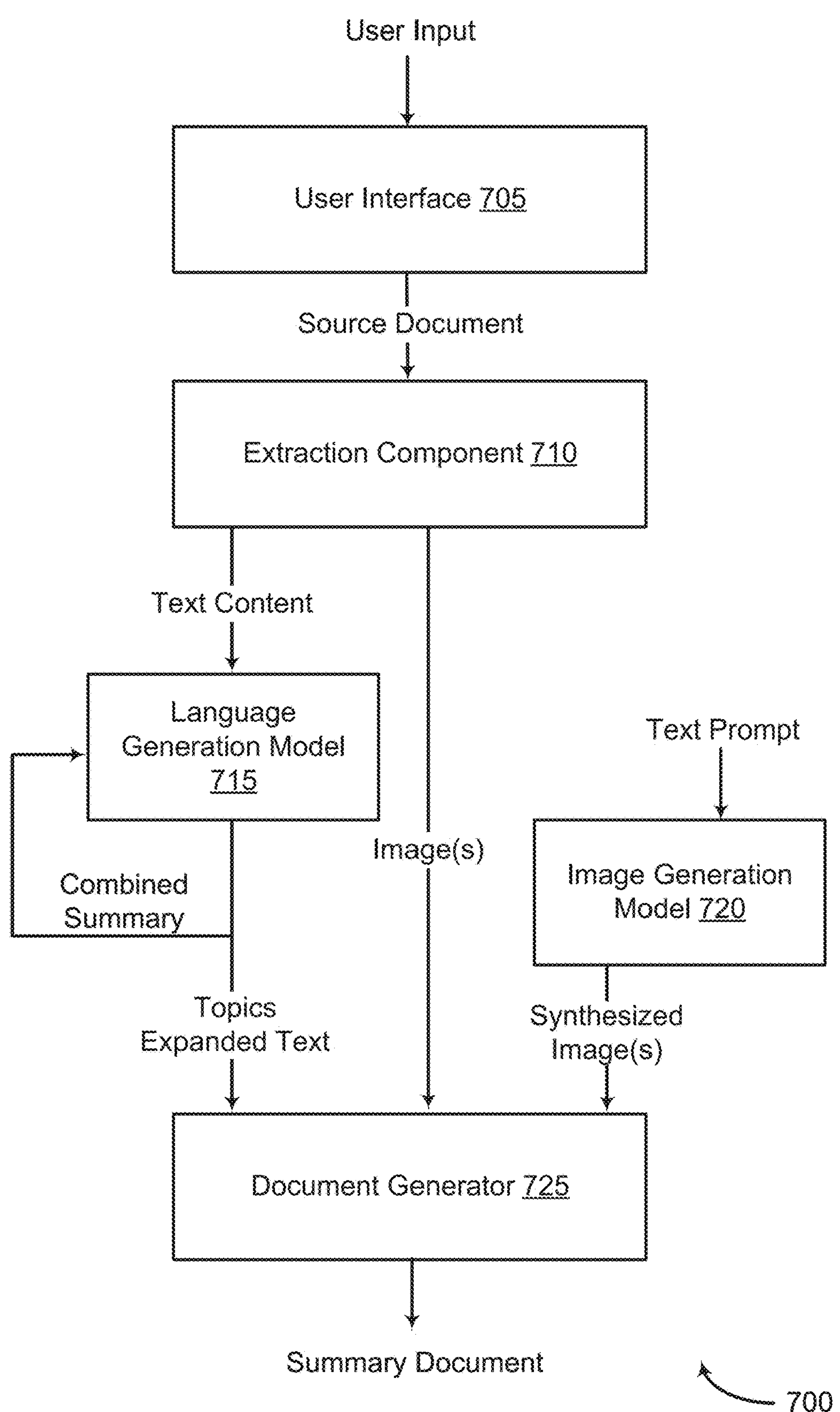
FIG. 7 shows an example of a machine learning model according to aspects of the present disclosure.
Figure 8:
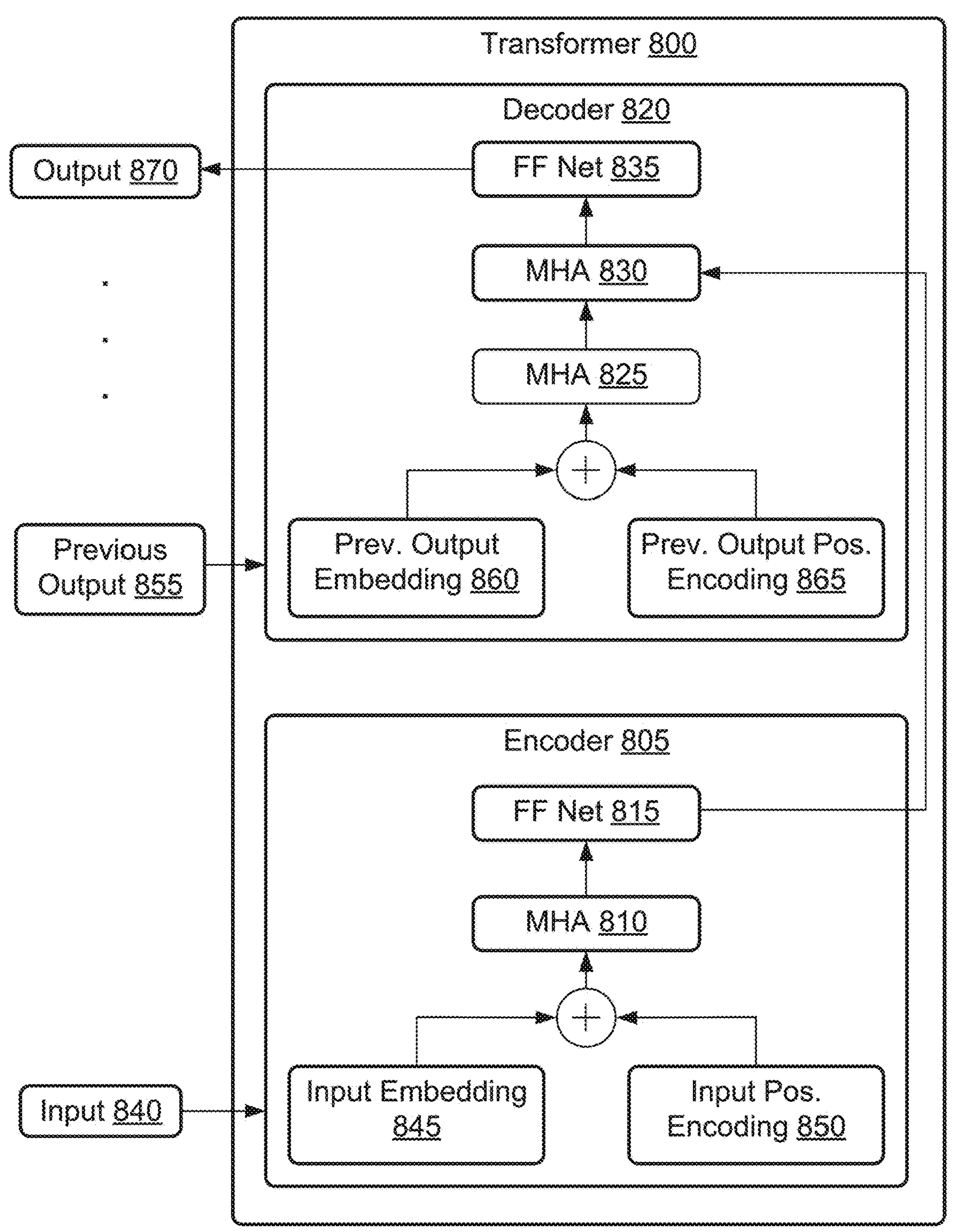
FIG. 8 shows an example of a transformer network according to aspects of the present disclosure.

In FIGS. 6-8, an apparatus and method for natural language processing are described. One or more embodiments of the apparatus and method include at least one processor; at least one memory including instructions executable by the at least one processor; a language generation model comprising parameters stored in the at least one memory and configured to generate a summary of a source document, a plurality of topics based on the summary and a predetermined number of topics, and expanded text for each of the plurality of topics; an extraction component comprising parameters stored in the at least one memory and configured to select an image from the source document for each of the plurality of topics by computing a similarity score between the image and the expanded text; and a document generator comprising parameters stored in the at least one memory and configured to generate a summary document based on the plurality of topics and the expanded text.

In some examples, the extraction component is configured to extract text content and a plurality of images from the source document, wherein the summary is based on the text content.

In some examples, the language generation model is configured to divide the text content into a plurality of segments, generate a plurality of segment summaries corresponding to the plurality of segments, respectively, and combine the plurality of segment summaries to obtain the summary of the source document.

Some examples of the apparatus and method further include a user interface configured to present a plurality of provisional topics and receive user input on the plurality of provisional topics.

Some examples of the apparatus and method further include an image generation model configured to generate a synthesized image based on a topic of the plurality of topics, wherein the summary document includes the synthesized image. In some examples, the language generation model comprises a Transformer network. In some examples, the document generator is configured to obtain a document template and generate the summary document based on the document template.

FIG. 6 shows an example of an NLP apparatus 600 according to aspects of the present disclosure. The example shown includes NLP apparatus 600, processor unit 605, I/O module 610, training component 615, and memory unit 620. NLP apparatus 600 is an example of, or includes aspects of, the corresponding element described with reference to FIG. 1. In some cases, NLP apparatus 600 may also be referred to as a document processing apparatus.

Machine learning model 625 is an example of, or includes aspects of, the corresponding element described with reference to FIG. 7. In one aspect, machine learning model 625 includes user interface 630, extraction component 635, language generation model 640, image generation model 645, and document generator 650.

Processor unit 605 is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, processor unit 605 is configured to operate a memory array using a memory controller. In other cases, a memory controller is integrated into the processor. In some cases, processor unit 605 is configured to execute computer-readable instructions stored in a memory to perform various functions. In some embodiments, processor unit 605 includes special purpose components for modem processing, baseband processing, digital signal processing, or transmission processing.

Examples of memory unit 620 include random access memory (RAM), read-only memory (ROM), or a hard disk. Examples of memory unit 620 include solid state memory and a hard disk drive. In some examples, memory unit 620 is used to store computer-readable, computer-executable software including instructions that, when executed, cause a processor to perform various functions described herein. In some cases, memory unit 620 contains, among other things, a basic input/output system (BIOS) which controls basic hardware or software operations such as the interaction with peripheral components or devices. In some cases, a memory controller operates memory cells. For example, the memory controller can include a row decoder, column decoder, or both. In some cases, memory cells within memory unit 620 store information in the form of a logical state.

In some examples, at least one memory unit 620 includes instructions executable by the at least one processor unit 605. Memory unit 620 includes machine learning model 625 or stores parameters of machine learning model 625.

I/O module 610 (e.g., an input/output interface) may include an I/O controller. An I/O controller may manage input and output signals for a device. I/O controller may also manage peripherals not integrated into a device. In some cases, an I/O controller may represent a physical connection or port to an external peripheral. In some cases, an I/O controller may utilize an operating system such as iOS®, ANDROID®, MS-DOS®, MS-WINDOWS®, OS/2®, UNIX®, LINUX®, or another known operating system. In other cases, an I/O controller may represent or interact with a modem, a keyboard, a mouse, a touchscreen, or a similar device. In some cases, an I/O controller may be implemented as part of a processor. In some cases, a user may interact with a device via an I/O controller or via hardware components controlled by an I/O controller.

In some examples, I/O module 610 includes a user interface. A user interface may enable a user to interact with a device. In some embodiments, the user interface may include an audio device, such as an external speaker system, an external display device such as a display screen, or an input device (e.g., remote control device interfaced with the user interface directly or through an I/O controller module). In some cases, a user interface may be a graphical user interface (GUI). In some examples, a communication interface operates at the boundary between communicating entities and the channel and may also record and process communications. Communication interface is provided herein to enable a processing system coupled to a transceiver (e.g., a transmitter and/or a receiver). In some examples, the transceiver is configured to transmit (or send) and receive signals for a communications device via an antenna.

According to some embodiments of the present disclosure, NLP apparatus 600 includes a computer implemented artificial neural network (ANN) for prediction and text generation. An ANN is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. Each node and edge is associated with one or more node weights that determine how the signal is processed and transmitted.

Accordingly, during the training process, the parameters and weights of the machine learning model 625 are adjusted to increase the accuracy of the result (i.e., by attempting to minimize a loss function which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

According to some embodiments, extraction component 635 is configured to extract text content and a set of images from the source document, wherein the summary is based on the text content. In some examples, extraction component 635 identifies an image from the source document. Extraction component 635 is an example of, or includes aspects of, the corresponding element described with reference to FIG. 7.

According to some embodiments, language generation model 640 generates a summary of a source document. In some examples, language generation model 640 generates a set of topics based on the summary and a predetermined number of topics. In some examples, language generation model 640 generates expanded text for each of the set of topics. In some examples, language generation model 640 divides the text content into a set of segments based on an input size of language generation model 640. Language generation model 640 generates a set of segment summaries corresponding to the set of segments, respectively. Language generation model 640 combines the set of segment summaries to obtain the summary of the source document.

In some examples, language generation model 640 generates a set of provisional topics. Language generation model 640 updates the set of provisional topics based on the user input to obtain the set of topics. In some examples, language generation model 640 receives a prompt as input that includes instructions to generate the set of topics to cover content of the summary. In some examples, language generation model 640 receives a prompt as input that includes instructions to generate the set of topics to be different from each other.

According to some embodiments, language generation model 640 comprises parameters stored in the at least one memory and is configured to generate a summary of a source document, a plurality of topics based on the summary and a predetermined number of topics, and expanded text for each of the plurality of topics. In some examples, the language generation model 640 is configured to divide the text content into a set of segments, generate a set of segment summaries corresponding to the set of segments, respectively, and combine the set of segment summaries to obtain the summary of the source document.

In some examples, language generation model 640 includes a Transformer network. Language generation model 640 is an example of, or includes aspects of, the corresponding element described with reference to FIG. 7.

According to some embodiments, machine learning model 625 computes a similarity score between the image and the expanded text corresponding to the topic, where the image is selected based on the similarity score. In some examples, machine learning model 625 filters the set of images to obtain a filtered set of images, where the image is selected from the filtered set of images.

According to some embodiments, user interface 630 is configured to present a set of provisional topics and receive user input on the set of provisional topics. User interface 630 is an example of, or includes aspects of, the corresponding element described with reference to FIG. 7.

According to some embodiments, image generation model 645 generates a synthesized image based on a topic of the set of topics, where the summary document includes the synthesized image. Image generation model 645 is an example of, or includes aspects of, the corresponding element described with reference to FIG. 7.

In an embodiment, image generation model 645 comprises a diffusion model. Diffusion models are a class of generative neural networks which can be trained to generate new data with features similar to features found in training data. In particular, diffusion models can be used to generate novel images. Diffusion models can be used for various image generation tasks including image super-resolution, generation of images with perceptual metrics, conditional generation (e.g., generation based on text guidance), image inpainting, and image manipulation.

Types of diffusion models include Denoising Diffusion Probabilistic Models (DDPMs) and Denoising Diffusion Implicit Models (DDIMs). In DDPMs, the generative process includes reversing a stochastic Markov diffusion process. DDIMs, on the other hand, use a deterministic process so that the same input results in the same output. Diffusion models may also be characterized by whether the noise is added to the image itself, or to image features generated by an encoder (i.e., latent diffusion).

According to some embodiments, document generator 650 generates a summary document based on the set of topics and the expanded text. The summary document includes the set of topics, the expanded text, and the selected image. In some examples, document generator 650 selects the image to represent a topic of the set of topics, where the summary document includes the selected image. In some examples, document generator 650 obtains a document template. Document generator 650 generates the summary document based on the document template. In some examples, the summary document is a multi-modal handout including an image corresponding to each of the set of topics. Document generator 650 is an example of, or includes aspects of, the corresponding element described with reference to FIG. 7.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

FIG. 7 shows an example of a machine learning model 700 according to aspects of the present disclosure. The example shown includes machine learning model 700, user interface 705, extraction component 710, language generation model 715, image generation model 720, and document generator 725. Machine learning model 700 is an example of, or includes aspects of, the corresponding element described with reference to FIG. 6.

In some embodiments, a source document, via user interface 705, is selected and transmitted to machine learning model 700. User interface 705 is an example of, or includes aspects of, the corresponding element described with reference to FIG. 6.

For example, the source document is a PDF document. Extraction component 710 is used to extract content (e.g., text, images) from the PDF document using Extract API. Extraction component 710 can maintain the reading order of the text inside the PDF document. For example, if the source document has two columns, extraction component 710 extracts the text content in the correct order that users normally read the source document. In some cases, the source document contains logos, footer images or header images, which repeat multiple times throughout the source document. These images are not informative enough to keep, so extraction component 710 is configured to ignore these types of unwanted images, e.g., by checking aspect ratios of these images, using hash algorithm. Extraction component 710 is an example of, or includes aspects of, the corresponding element described with reference to FIG. 6.

Extracted text content is then input to language generation model 715. In some cases, length of the text content is larger than a context length of the language generation model 715 (at a single shot), so the text content is divided into multiple smaller text segments or chunks. Each text segment is input to language generation model 715. Following a first prompt, language generation model 715 generates a summary for each text segment of the text segments. A set of segment summaries are combined to obtain a combined summary or concatenated summary. The combined summary is also referred to as a summary of the source document or a document summary. Language generation model 715 is an example of, or includes aspects of, the corresponding element described with reference to FIG. 6.

In some embodiments, language generation model 715 takes the combined summary as input. Following a second prompt, language generation model 715 generates or extracts a set of different topics based on the combined summary. The set of generated topics may cover important aspects of the source document as much as possible. In some examples, the set of generated topics are flat in terms of hierarchy (i.e., the depth of the topics is not deep). The hierarchy of the generated topics follows an ordering of first topic, second topic, third topic, . . . , etc. A topic may not have subtopics. In some examples, language generation model 715 includes a Transformer network such as GPT 3.5, GPT 4, etc.

In an embodiment, users can modify, add to, or remove the generated topics via user interface. Instead of letting language generation model 715 handle topic generation, users may choose to set the number of topics to be generated (e.g., generate seven topics). User feedback is optional.

In an embodiment, language generation model 715 is used to generate expanded text for each of the generated topics. The expanded text includes multiple sentences that are generated based on the combined summary.

For each generated text segment of the handout which needs a corresponding image, machine learning model 700 ranks the filtered images of the source document according to their similarity with the text. For example, machine learning model 700 measures similarity by computing a cosine similarity of CLIP embedding of text and CLIP embedding of images. Machine learning model 700 selects a candidate image that has the highest similarity score as an image under a topic. Machine learning model 700 is configured to select an image from the source document for each of the set of topics by computing a similarity score between the image and the expanded text.

In some embodiments, machine learning model 700 identifies a set of images from the source document a pre-determined selection factor. Machine learning model 700 filters the set of images based on the pre-determined selection factor to obtain a filtered set of images, wherein the filtered set of images includes the selected image. In some examples, a multi-modal encoder generates a multi-modal text embedding based on the expanded text; generates a multi-modal image embedding based on the image. Machine learning model 700 computes the similarity score by comparing the multi-modal text embedding and the multi-modal image embedding.

In some cases, image generation model 720 generates a synthesized image using a diffusion model based on a text prompt (e.g., a prompt containing text section heading). As such, image generation model 720 generates a predetermined number of text segments and images accompanying each text segment of the text segments. Image generation model 720 is an example of, or includes aspects of, the corresponding element described with reference to FIG. 6.

Document generator 725 generates a summary document that is a multi-modal summarized version of the source document. The generated summary document includes the set of topics, the expanded text, and the selected image. In some examples, the summary document is a handout covering important topics in the source document. Document generator 725 is an example of, or includes aspects of, the corresponding element described with reference to FIG. 6.

FIG. 8 shows an example of a transformer network according to aspects of the present disclosure. The example shown includes transformer 800, encoder 805, decoder 820, input 840, input embedding 845, input positional encoding 850, previous output 855, previous output embedding 860, previous output positional encoding 865, and output 870.

In some cases, encoder 805 includes multi-head self-attention sublayer 810 and feed-forward network sublayer 815. In some cases, decoder 820 includes first multi-head self-attention sublayer 825, second multi-head self-attention sublayer 830, and feed-forward network sublayer 835.

According to some aspects, a machine learning model (such as the machine learning model described with reference to FIGS. 6 and 7) comprises transformer 800. In some cases, encoder 805 is configured to map input 840 (for example, a query or a prompt comprising a sequence of words or tokens) to a sequence of continuous representations that are fed into decoder 820. In some cases, decoder 820 generates output 870 (e.g., a prediction of an output sequence of words or tokens) based on the output of encoder 805 and previous output 855 (e.g., a previously predicted output sequence), which allows for the use of autoregression.

For example, in some cases, encoder 805 parses input 840 into tokens and vectorizes the parsed tokens to obtain input embedding 845, and adds input positional encoding 850 (e.g., positional encoding vectors for input 840 of a same dimension as input embedding 845) to input embedding 845. In some cases, input positional encoding 850 includes information about relative positions of words or tokens in input 840.

In some cases, encoder 805 comprises one or more encoding layers (e.g., six encoding layers) that generate contextualized token representations, where each representation corresponds to a token that combines information from other input tokens via self-attention mechanism. In some cases, each encoding layer of encoder 805 comprises a multi-head self-attention sublayer (e.g., multi-head self-attention sublayer 810). In some cases, the multi-head self-attention sublayer implements a multi-head self-attention mechanism that receives different linearly projected versions of queries, keys, and values to produce outputs in parallel. In some cases, each encoding layer of encoder 805 also includes a fully connected feed-forward network sublayer (e.g., feed-forward network sublayer 815) comprising two linear transformations surrounding a Rectified Linear Unit (ReLU) activation:

$$FFN(x) = ReLU(W_1 x + b_1)W_2 + b_2 \tag{1}$$

In some cases, each layer employs different weight parameters ($W_1$, $W_2$) and different bias parameters ($b_1$, $b_2$) to apply a same linear transformation each word or token in input 840.

In some cases, each sublayer of encoder 805 is followed by a normalization layer that normalizes a sum computed between a sublayer input x and an output sublayer (x) generated by the sublayer:

$$layernorm(x + sublayer(x)) \tag{2}$$

In some cases, encoder 805 is bidirectional because encoder 805 attends to each word or token in input 840 regardless of a position of the word or token in input 840.

In some cases, decoder 820 comprises one or more decoding layers (e.g., six decoding layers). In some cases, each decoding layer comprises three sublayers including a first multi-head self-attention sublayer (e.g., first multi-head self-attention sublayer 825), a second multi-head self-attention sublayer (e.g., second multi-head self-attention sublayer 830), and a feed-forward network sublayer (e.g., feed-forward network sublayer 835). In some cases, each sublayer of decoder 820 is followed by a normalization layer that normalizes a sum computed between a sublayer input x and an output sublayer (x) generated by the sublayer.

In some cases, decoder 820 generates previous output embedding 860 of previous output 855 and adds previous output positional encoding 865 (e.g., position information for words or tokens in previous output 855) to previous output embedding 860. In some cases, each first multi-head self-attention sublayer receives the combination of previous output embedding 860 and previous output positional encoding 865 and applies a multi-head self-attention mechanism to the combination. In some cases, for each word in an input sequence, each first multi-head self-attention sublayer of decoder 820 attends only to words preceding the word in the sequence, and so transformer 800's prediction for a word at a particular position only depends on known outputs for a word that came before the word in the sequence. For example, in some cases, each first multi-head self-attention sublayer implements multiple single-attention functions in parallel by introducing a mask over values produced by the scaled multiplication of matrices Q and K by suppressing matrix values that would otherwise correspond to disallowed connections.

In some cases, each second multi-head self-attention sublayer implements a multi-head self-attention mechanism similar to the multi-head self-attention mechanism implemented in each multi-head self-attention sublayer of encoder 805 by receiving a query Q from a previous sublayer of decoder 820 and a key K and a value V from the output of encoder 805, allowing decoder 820 to attend to each word in the input 840.

In some cases, each feed-forward network sublayer implements a fully connected feed-forward network similar to feed-forward network sublayer 815. In some cases, the feed-forward network sublayers are followed by a linear transformation and a softmax to generate a prediction of output 870 (e.g., a prediction of a next word or token in a sequence of words or tokens). Accordingly, in some cases, transformer 800 generates a response as described herein based on a predicted sequence of words or tokens.

Summary Document Generation

Figure 9:
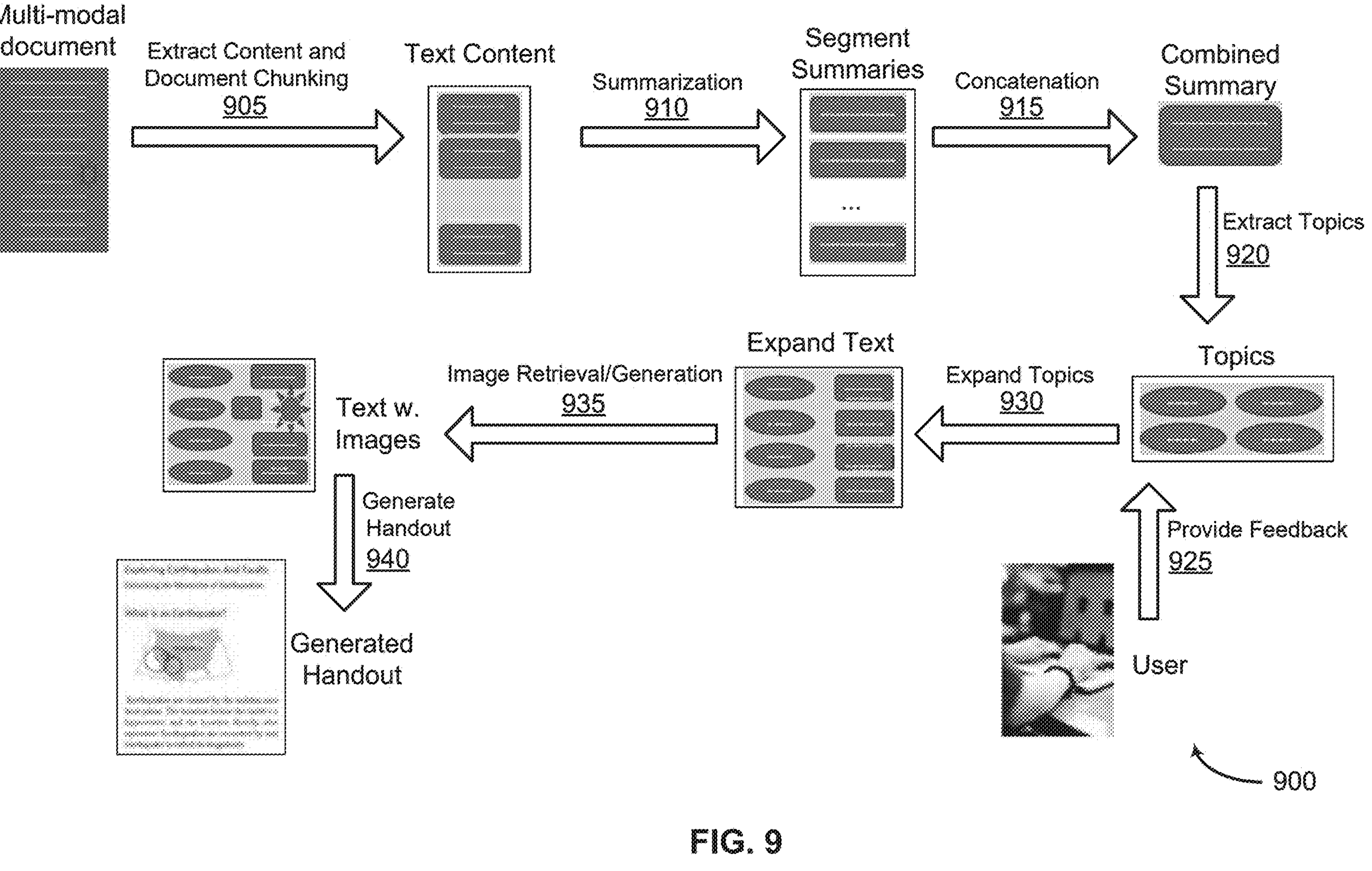
FIG. 9 shows an example of a method for generating a summary document according to aspects of the present disclosure.

FIG. 9 shows an example of a method 900 for generating a summary document according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 905, the system extracts content and performs document chunking based on a source document. In some cases, the operations of this step refer to, or may be performed by, an extraction component as described with reference to FIGS. 6 and 7. In some cases, the source document includes multi-modal content. The source document is converted to a PDF document which is input to the extraction component to obtain extracted text content. For example, Extract API is used to extract text content from the source document. In some cases, the source document has two columns on each page, and the text content is extracted in the correct order that users normally read the source document.

In some embodiments, the language generation model based on the present disclosure divides the extracted text content into multiple smaller segments/chunks. In some cases, the number of chunks (i.e., a number of topics in the summary document) is specified by a user as a hyper-parameter. In some cases, when there is no user-specified number of chunks, a clustering/topic model is applied to determine the number of content clusters present in the source document, and the number of chunks is determined accordingly. When the number of chunks is n and the total length of the extracted text content is M, the system divides the extracted text content into n chunks, each with a maximum size of ceiling (M/n).

At operation 910, the system performs summarization based on the extracted text content. In some cases, the operations of this step refer to, or may be performed by, a language generation model as described with reference to FIGS. 6 and 7. In some cases, the extracted text content is divided into n segments/chunks, each with a maximum size of ceiling(M/n). The language generation model generates a set of segment summaries, one summary for each of the n chunks. In some cases, the language generation model has a maximum input length of T tokens. The length of each generated summary is s=floor(T/n). For example, the language generation model includes a Transformer network (with reference to FIG. 8).

At operation 915, the system performs concatenation by combining the set of segment summaries to obtain a combined summary. In some cases, the operations of this step refer to, or may be performed by, a language generation model as described with reference to FIGS. 6 and 7. In some cases, the length of the combined summary is less than or equal to the maximum input length T of the language generation model.

At operation 920, the system extracts a set of topics based on the combined summary. In some cases, the operations of this step refer to, or may be performed by, a language generation model as described with reference to FIGS. 6 and 7. The set of generated topics cover important aspects of the source document as much as possible. In some examples, the set of generated topics are flat in terms of hierarchy. The hierarchy of the generated topics follows an ordering of first topic, second topic, third topic, . . . , etc.

At operation 925, the system receives feedback from a user about the set of topics. In some cases, the operations of this step refer to, or may be performed by, a user interface as described with reference to FIGS. 6 and 7. In some embodiments, the user can modify, add to, or remove the generated topics via the user interface. The user can set a predetermined number of topics to be generated. For example, if the user sets the number of topics to be seven, the language generation model generates seven topics that cover the seven most important aspects of the source document. The predetermined number of topics may be equal or greater than the number of original section topics in the source document.

At operation 930, the system generates expanded text for each of the set of topics. In some cases, the operations of this step refer to, or may be performed by, a language generation model as described with reference to FIGS. 6 and 7. The expanded text includes sentences corresponding to a topic and the expanded text is generated based on the combined summary.

At operation 935, the system extracts a set of images from the source document based on the set of topics and the expanded text or generates synthesized images. In some cases, the operations of this step refer to, or may be performed by, an extraction component and an image generation model as described with reference to FIGS. 6 and 7.

In some cases, the extraction component (e.g., Extract API) detects lines and other objects in the source document as images. An additional logic is implemented to filter out noisy images. If the aspect ratio of an image is greater than 2 or less than 0.5, the extraction component filters the image out. Images such as logos, headers, and footers may appear multiple times in the source document and are not relevant when generating a clean multi-modal summary document. A hashing algorithm is used to detect images which are similar to each other, and all occurrences are removed except one.

For each text segment of the handout that needs a corresponding image, the filtered images of the source document are ranked based on a similarity score of the image with the text segment. For example, the similarity score is obtained by computing a cosine similarity of CLIP embedding of the text segment and candidate images. The system selects a candidate image that has the highest similarity score as an image for a topic. In some cases, a diffusion model generates a synthesized image based on a text prompt (e.g., a prompt containing a section heading). Accordingly, text segments are accompanied by one or more images.

At operation 940, the system generates a summary document. In some cases, the operations of this step refer to, or may be performed by, a document generator as described with reference to FIGS. 6 and 7.

The summary document (e.g., a handout) is a multi-modal summarized version of the source document. The summary document contains key elements from important topics of the source document. The handout includes text, images, and other special objects such as tables and charts. The handout includes formal language with complete sentences and content of the handout is easy to follow. Text and relevant images are placed in adjacent locations of the handout so that users can easily understand the concepts.

FIG. 10 shows an example of a method 1000 for generating a summary of a source document according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1005, the system extracts text content from the source document, where the summary is based on the text content. In some cases, the operations of this step refer to, or may be performed by, an extraction component as described with reference to FIGS. 6 and 7.

In some embodiments, the extraction component is configured to extract multi-modal content from the source document. The source document is exported to PDF format.

For example, if the source document is a word file (.docx), LibreOffice package is used to convert the word file to a PDF document. In some examples, to extract text content and images from the PDF document, the extraction component uses Adobe® Extract API. The output from the API is a zip file which contains the detected images and the text content from the source document.

At operation 1010, the system divides the text content into a set of segments based on an input size of the language generation model. In some cases, the operations of this step refer to, or may be performed by, a language generation model as described with reference to FIGS. 6 and 7. In some examples, the number of text and number of images to put in the summary document (e.g., handout) are hyper-parameters set by users. Once the number of text and images are set, the language generation model applies divide-and-conquer method to extract content from the source document.

In some embodiments, the language generation model divides the source document into a set of segments (e.g., multiple smaller chunks). Assume that there are n chunks in total. If M is the total length of the source document (text), the size (#tokens) of each segment is equal to maximum ceiling(M/n).

At operation 1015, the system generates a set of segment summaries corresponding to the set of segments, respectively. In some cases, the operations of this step refer to, or may be performed by, a language generation model as described with reference to FIGS. 6 and 7.

In some embodiments, each of the segments is input to the language generation model (e.g., a large language model such as GPT 3.5) to generate a small summary of each segment. Assume that the language generation model has a maximum input length of T tokens, the length of each generated summary is set to: s=floor(T/n).

At operation 1020, the system combines the set of segment summaries to obtain the summary of the source document. In some cases, the operations of this step refer to, or may be performed by, a language generation model as described with reference to FIGS. 6 and 7.

In an embodiment, the n generated summaries are concatenated to obtain a concatenated summary, which is the summary of the source document. The length of the concatenated summary is less than or equal to T.

FIG. 11 shows an example of a method 1100 for updating topics according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1105, the system generates a set of provisional topics. In some cases, the operations of this step refer to, or may be performed by, a language generation model as described with reference to FIGS. 6 and 7.

In some embodiments, the language generation model generates a set of important topics (or smart outline) with the corresponding topic titles. In some examples, the topics can be different from the section headings present in the summary document. The language generation model is configured to generate topics that cover the entire document (coverage) and are different from each other (diversity). In some cases, these generated topics are referred to as provisional topics (i.e., prior to user feedback).

At operation 1110, the system receives user input on the set of provisional topics. In some cases, the operations of this step refer to, or may be performed by, a user interface as described with reference to FIGS. 6 and 7.

Users can change the number of provisional topics. In an example, the input number of topics set by a user is K. Then the language generation model generates K most important topics based on the source document. Users can modify some of the provisional topics generated by the language generation model. Users can add a new topic or remove an existing topic.

At operation 1115, the system updates the set of provisional topics based on the user input to obtain the set of topics. In some cases, the operations of this step refer to, or may be performed by, a language generation model as described with reference to FIGS. 6 and 7.

In some examples, the language generation model is configured to expand each topic of the set of topics with a predetermined number of sentences to be put into the summary document (e.g., handout). Content for the generation of topics and their expansion depends on the concatenated summary (i.e., summary of the source document). This way, noisy or irrelevant content generated by the language generation model is decreased.

FIG. 12 shows an example of a computing device 1200 according to aspects of the present disclosure. The example shown includes computing device 1200, processor(s) 1205, memory subsystem 1210, communication interface 1215, I/O interface 1220, user interface component(s) 1225, and channel 1230. In one embodiment, computing device 1200 includes processor(s) 1205, memory subsystem 1210, communication interface 1215, I/O interface 1220, user interface component(s) 1225, and channel 1230.

In some embodiments, computing device 1200 is an example of, or includes aspects of, NLP apparatus 110 of FIG. 1. In some embodiments, computing device 1200 includes one or more processors 1205 that can execute instructions stored in memory subsystem 1210 to generate, using a language generation model, a summary of a source document; generate, using the language generation model, a plurality of topics based on the summary and a predetermined number of topics; generate, using the language generation model, expanded text for each of the plurality of topics; and generate a summary document based on the plurality of topics and the expanded text.

According to some embodiments, computing device 1200 includes one or more processors 1205. In some cases, a processor is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or a combination thereof. In some cases, a processor is configured to operate a memory array using a memory controller. In other cases, a memory controller is integrated into a processor. In some cases, a processor is configured to execute computer-readable instructions stored in a memory to perform various functions. In some embodiments, a processor includes special purpose components for modem processing, baseband processing, digital signal processing, or transmission processing.

According to some embodiments, memory subsystem 1210 includes one or more memory devices. Examples of a memory device include random access memory (RAM), read-only memory (ROM), or a hard disk. Examples of memory devices include solid state memory and a hard disk drive. In some examples, memory is used to store computer-readable, computer-executable software including instructions that, when executed, cause a processor to perform various functions described herein. In some cases, the memory contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

According to some embodiments, communication interface 1215 operates at a boundary between communicating entities (such as computing device 1200, one or more user devices, a cloud, and one or more databases) and channel 1230 and can record and process communications. In some cases, communication interface 1215 is provided to enable a processing system coupled to a transceiver (e.g., a transmitter and/or a receiver). In some examples, the transceiver is configured to transmit (or send) and receive signals for a communications device via an antenna.

According to some embodiments, I/O interface 1220 is controlled by an I/O controller to manage input and output signals for computing device 1200. In some cases, I/O interface 1220 manages peripherals not integrated into computing device 1200. In some cases, I/O interface 1220 represents a physical connection or port to an external peripheral. In some cases, the I/O controller uses an operating system such as iOS®, ANDROID®, MS-DOS®, MS-WINDOWS®, OS/2®, UNIX®, LINUX®, or other known operating system. In some cases, the I/O controller represents or interacts with a modem, a keyboard, a mouse, a touchscreen, or a similar device. In some cases, the I/O controller is implemented as a component of a processor. In some cases, a user interacts with a device via I/O interface 1220 or via hardware components controlled by the I/O controller.

According to some embodiments, user interface component(s) 1225 enable a user to interact with computing device 1200. In some cases, user interface component(s) 1225 include an audio device, such as an external speaker system, an external display device such as a display screen, an input device (e.g., a remote control device interfaced with a user interface directly or through the I/O controller), or a combination thereof. In some cases, user interface component(s) 1225 include a GUI.

Performance of apparatus, systems and methods of the present disclosure have been evaluated, and results indicate embodiments of the present disclosure have obtained increased performance over existing technology. Example experiments demonstrate that the NLP apparatus (or document processing apparatus) described in embodiments of the present disclosure outperforms conventional systems.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method comprising:

obtaining a source document that covers a plurality of topics;

generating, using a language generation model, a plurality of topic titles corresponding to the plurality of topics, wherein the plurality of topic titles are generated by combining content from the source document with a prompt including instructions indicating a predetermined number of topics, instructions for the plurality of topic titles to cover the content, and instructions for the plurality of topic titles to be different from each other, and performing a self-attention mechanism on the content and the prompt;

generating, using the language generation model, expanded text for each of the plurality of topics based on the plurality of topic titles;

generating a summary document including the plurality of topic titles and the expanded text.

2. The method of claim 1, wherein generating the plurality of topic titles comprises:

extracting text content from the source document, wherein the plurality of topic titles are based on the text content.

3. The method of claim 2, wherein generating the plurality of topic titles of the source document comprises:

dividing the text content into a plurality of segments based on an input size of the language generation model;

generating a plurality of segment summaries corresponding to the plurality of segments, respectively; and combining the plurality of segment summaries to obtain a summary of the source document, wherein the plurality of topic titles are based on the summary.

4. The method of claim 1, further comprising:

identifying a plurality of images from the source document and a pre-determined selection factor; and filtering the plurality of images based on the pre-determined selection factor to obtain a filtered set of images, wherein the filtered set of images includes an image from the source document.

5. The method of claim 1, further comprising:

generating a multi-modal text embedding based on the expanded text;

generating a multi-modal image embedding based on an image from the source document; and computing a similarity score by comparing the multi-modal text embedding and the multi-modal image embedding.

6. The method of claim 1, further comprising:

extracting a plurality of images from the source document; and filtering the plurality of images to obtain a filtered set of images, wherein an image is selected from the filtered set of images.

7. The method of claim 1, wherein generating the summary document comprises:

generating a synthesized image based on a topic of the plurality of topics, wherein the summary document includes the synthesized image.

8. The method of claim 1, wherein generating the plurality of topic titles comprises:

generating a plurality of provisional topics;

receiving user input on the plurality of provisional topics; and updating the plurality of provisional topics based on the user input to obtain the plurality of topic titles.

9. The method of claim 1, further comprising:

generating, using the language generation model, a summary of the source document, wherein the content comprises the summary of the source document.

10. The method of claim 1, further comprising:

selecting an image from the source document for each of the plurality of topics by computing a similarity score between the image and the expanded text.

11. The method of claim 1, wherein generating the summary document comprises:

obtaining a document template; and generating the summary document based on the document template.

12. The method of claim 1, wherein:

the summary document is a multi-modal handout including an image corresponding to each of the plurality of topics.

13. An apparatus comprising:

at least one processor;

at least one memory including instructions executable by the at least one processor;

a language generation model comprising parameters stored in the at least one memory and configured to obtain a source document that covers a plurality of topics, generate a plurality of topic titles corresponding to the plurality of topics, wherein the plurality of topic titles are generated by combining content from the source document with a prompt including instructions indicating a predetermined number of topics, instructions for the plurality of topic titles to cover the content, and instructions for the plurality of topic titles to be different from each other, and performing a self-attention mechanism on the content and the prompt, and generate expanded text for each of the plurality of topics based on the plurality of topic titles;

an extraction component comprising parameters stored in the at least one memory and configured to select an image from the source document for each of the plurality of topics by computing a similarity score between the image and the expanded text; and a document generator comprising parameters stored in the at least one memory and configured to generate a summary document including the plurality of topic titles and the expanded text.

14. The apparatus of claim 13, wherein:

the extraction component extracts text content and a plurality of images from the source document, wherein the plurality of topic titles are based on the text content.

15. The apparatus of claim 14, wherein:

the language generation model is configured to divide the text content into a plurality of segments, generate a plurality of segment summaries corresponding to the plurality of segments, respectively, and combine the plurality of segment summaries to obtain the plurality of topic titles of the source document.

16. The apparatus of claim 13, further comprising:

a user interface configured to present a plurality of provisional topics and receive user input on the plurality of provisional topics.

17. The apparatus of claim 13, further comprising:

an image generation model configured to generate a synthesized image based on a topic of the plurality of topics, wherein the summary document includes the synthesized image.

18. The apparatus of claim 13, wherein:

the language generation model comprises a Transformer network.

19. The apparatus of claim 13, wherein:

the document generator is configured to obtain a document template and generate the summary document based on the document template.

20. A non-transitory computer readable medium storing code for natural language processing, the code comprising instructions executable by at least one processor to:

obtain a source document that covers a plurality of topics;

generate, using a language generation model, a plurality of topic titles corresponding to the plurality of topics, wherein the plurality of topic titles are generated by combining content from the source document with a prompt including instructions indicating a predetermined number of topics, instructions for the plurality of topic titles to cover the content, and instructions for the plurality of topic titles to be different from each other, and performing a self-attention mechanism on the content and the prompt;

generate, using the language generation model, expanded text for each of the plurality of topics based on the plurality of topic titles;

and generate a summary document including the plurality of topic titles and the expanded text.

* * * * *